April 19, 1949.  G. D. HULBURT ET AL  2,467,671

PIPE BENDING MACHINE

Filed Nov. 2, 1943

INVENTORS
George D. Hulburt
Raymond E. Conaway

BY Robt L. Gunn
ATTORNEY

Patented Apr. 19, 1949

2,467,671

UNITED STATES PATENT OFFICE 2,467,671

PIPE-BENDING MACHINE

George Delbert Hulburt and Raymond Emory Conaway, Los Angeles, Calif., assignors to Twentieth Century-Fox Film Corporation, Los Angeles, Calif., a corporation of New York Application November 2, 1943, Serial No. 508,656

5 Claims. (Cl. 153—54)

This invention relates to pipe bending machinery and deals particularly with an improvement in the means for adjusting such machinery to handle pipe of various diameters and to make bends of different radii.

The principal object of the invention to be described hereinafter is to provide means in a pipe bending machine whereby the machine may be quickly and easily adjusted to make bends of different radii in pipes of different diameters. In its preferred form this feature is incorporated by means of a sliding carriage which carries one of the pressure rollers with its attendant driving means.

Another object of this invention is to provide a pipe bending machine having three pressure rollers, one of which is adjustable relative to the other two, all of which rollers are driven synchronously.

A further object of the invention is to provide a driving means for a plurality of rollers comprising two fixed rollers and one adjustable roller wherein said means consists of a single continuous chain engaging said rollers. Still another object of this invention is to provide in a pipe bending machine employing three pressure rollers driven by a continuous chain an adjustably movable carriage upon which are mounted one of said rollers and an auxiliary idler sprocket engaging said chain.

Other objects and advantages will become apparent as the description proceeds in conjunction with the drawings in which.

Figures 1, 2, 3, 4:
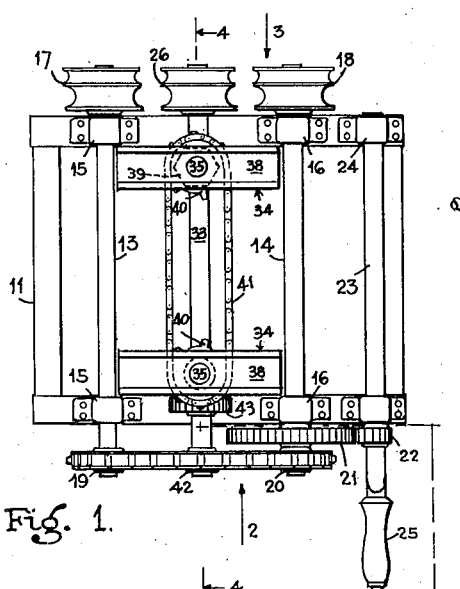
Figure 1 is a plan view of the machine.
Figure 2 is an end view taken in the direction of the arrow 2 in Figure 1.
Figure 3 is another end view taken in the direction of the arrow 3 in Figure 1.
Figure 4 is a sectional view taken on lines 4—4 of Figure 1 and Figure 2.

Briefly stated, the invention amounts to the conventional three pressure rollers usually embodied in pipe bending machines with means for moving one of the rollers so as to change the radius of the bend in the pipe. The means employed for this purpose comprises a carriage movably mounted upon the machine so that one of the rollers may be moved relative to the other two, together with a novel means for synchronously driving the three rollers in their various positions.

Referring to the drawings, it will be observed that our machine comprises, generally speaking, a frame 11 supported in any desired manner such as by legs 12. Rotatably mounted upon the frame 11 are two shafts 13 and 14 which are carried in bearings 15 and 16. Upon these two shafts we mount pressure rollers 17 and 18 respectively and as shown in this case these rollers comprise two rollers of different sizes adapted to receive pipe of different diameter. On the opposite end of the shafts 13 and 14 we mount sprocket wheels 19 and 20 respectively. The shaft 14 also carries a spur gear 21 which meshes with another spur gear 22 keyed to a shaft 23 that is rotatably mounted upon the frame 11 in bearings 24. The outer end of the shaft 23 carries a crank handle 25. This arrangement serves to rotate the shaft 14.

The third pressure roller designated 26 comprises two sizes of rollers similar to rollers 17 and 18 and is mounted upon a shaft 27, which shaft in turn is carried in bearings 28. The bearings 28 in turn are mounted upon a carriage generally designated 29 which consists of a four sided hollow member having cross members 30 and vertical members 31. The lower cross member 30 carries the bearing 28 and on the underside of the upper member 30 a bearing 32 is also fixed. This bearing carries a shaft 33. In describing the carriage 29 it is to be understood that there are two of these carriages working at opposite ends of the shafts and that a description of one will serve for a description of both except where noted.

The carriage generally designated 29 is slidably mounted for vertical movement in a superstructure generally designated 34. With respect to the superstructure 34 it might be stated here that such a structure preferably is built of channel iron with the legs of the channel turned inwardly. It may be either welded or riveted into form. In this case applicant shows a welded structure. The carriage 29 itself should likewise be formed of channel iron of smaller width to slide in the groove of the channel of the superstructure itself. The means for moving the carriage 29 vertically in the superstructure comprise a screw threaded rod 35 which is attached to and is fixed against rotation on the carriage. The rod 35 extends freely through a header 36 in the superstructure and passes through a member generally designated 37 which screw threadedly engages the rod 35. The rod may then pass on upwardly through a top cross member 38 of the super structure 34. The member 37, as stated, screw threadedly engages the rod 35 and as shown is held against vertical movement between the members 36 and 38 of the superstructure 34. Consequently, any rotation of the member 37 will pass the rod 35 and move the carriage upwardly or downwardly depending upon which way the member is turned. The means for turning the member may take a variety of forms. It may be manually driven or it may be power driven. In this case we have shown a nut 39 formed integral with the member so that the entire member may be turned with a large open ended wrench. Since there are two of these members to be turned, it is desirable to turn both members simultaneously. For this purpose we use sprocket gears 40 on each of the said members 37 and connect the two members together by means of a chain drive 41. Under this arrangement any turning of the nut 39 will simultaneously turn both members. Although we have shown but one nut on one of the members 37, it is to be understood that both members could be likewise equipped if found necessary or desirable.

On the outer end of the shaft 33 we fix a sprocket 42 which lines up with sprockets 19 and 20. Also in the same shaft we fix a spur gear 43 adapted to mesh with spur gear 44 fixed to shaft 27. This spur gear arrangement is for the purpose of driving the roller 26 in the proper direction with respect to the rotation of rollers 17 and 18.

Depending from the carriage 29 is a substructure generally designated 45. This substructure is arranged to move with the carriage and may be considered a part of the carriage. The purpose of this arrangement is to carry a shaft 46 which in turn carries an auxiliary sprocket 47 adapted to line up with sprockets 19, 20, and 42. The sprocket wheel 47 is in the nature of an idler sprocket and is for the purpose of keeping the proper tension in a continuous drive chain 48 which engages and drives the above mentioned four sprocket wheels. As will be seen from this structure, the sprocket wheels 42 and 47 will move with the carriage 29 which in turn moves the pressure roller 26. As these two sprocket wheels move upwardly or downwardly the continuous chain 48 will adjust itself over the sprockets 19 and 20. Within a limited range the tension in the chain will remain substantially uniform. However, upon a large movement of the carriage the tension in the chain will decrease and will accumulate slack. The means for taking up this slack consists in the adjustable movement of the shaft 46.

Referring to Figures 2, 3, and 4, it will be seen that the shaft 46 is mounted in blocks 49 at each end, which blocks in turn are slidably mounted between two inwardly turned channel members 50 carried on the lower part of the substructure 45. The means for vertically moving these blocks consists of a pair of screw threaded rods 51, which screw threadedly engage members 52 carried in cross members 53 which are a part of the substructure. The screw threaded members 51 are rotatably attached to the blocks 49 so that they will move the blocks upwardly or downwardly in response to turning of the rod itself.

In operation, the rollers 17, 18, and 26 are opened to receive a piece of pipe P. The roller 26 is then adjusted to its proper position by the nut 39 to make a bend of the desired radius in the pipe. After setting the roller 26 in the desired position, the tension in the chain 48 is adjusted by means of the screw threaded rods 51. When this is done the machine is ready to form a bend in the pipe, which is accomplished by rotating the crank handle 25. It is to be understood with respect to power that the machine may be power driven without changing any of the novelty therein. Pipes of different diameter may be bent as shown by the dual rollers 17, 18, and 26; also bends of different radii may be put in pipes of different diameter by adjusting the position of the roller 26 through the nut 39. A machine of this character will provide a much needed utility in pipe bending machines for adjusting a single machine to accommodate pipes of different diameters and for forming bends of different radii.

We claim:

1. A pipe bending machine comprising a frame, three pressure rollers rotatably supported by said frame, two of said rollers being arranged to rotate about spaced fixed axes, a carriage movably mounted on said frame, means for rotatably mounting the third of said rollers on said carriage, a continuous chain for driving all of said rollers and an auxiliary sprocket mounted on said carriage and adapted to engage said chain for controlling the tension therein, and means for moving said carriage to change the distance relation between the axis of rotation of said third roller with respect to the axes of rotation of said other two rollers.

2. A pipe bending machine comprising a frame, three pressure rollers rotatably supported by said frame, two of said rollers being arranged to rotate about spaced fixed axes, a carriage movably mounted on said frame, means for rotatably mounting the third of said rollers on said carriage, a continuous chain for driving all of said rollers and an auxiliary sprocket mounted on said carriage and adapted to engage said chain for controlling the tension therein, means for moving said carriage to change the distance relation between the axis of rotation of said third roller with respect to the axes of rotation of said other two rollers, and means for adjusting said auxiliary sprocket to change the tension in said chain.

3. A pipe bending machine comprising a frame, three pressure rollers rotatably supported by said frame, two of said rollers being arranged to rotate about spaced fixed axes, a carriage movably mounted on said frame, means for rotatably mounting the third of said rollers on said carriage, a continuous chain for driving all of said rollers and an auxiliary sprocket mounted on said carriage and adapted to engage said chain for controlling the tension therein, means for moving said carriage to change the distance relation between the axis of rotation of said third roller with respect to the axes of rotation of said other two rollers, and means for adjusting said auxiliary sprocket to change the tension in said chain, said last mentioned means including a shaft for said auxiliary sprocket and a bearing for said shaft slidably mounted on said carriage.

4. A pipe bending machine comprising a frame, three pressure rollers rotatably supported by said frame, two of said rollers being arranged to rotate about spaced fixed axes, a carriage movably mounted on said frame, means for rotatably mounting the third of said rollers on said carriage, a continuous chain for driving all of said rollers and an auxiliary sprocket mounted on said carriage and adapted to engage said chain for controlling the tension therein, means for moving said carriage to change the distance relation between the axis of rotation of said third roller with respect to the axes of rotation of said other two rollers, and means for adjusting said auxiliary sprocket to change the tension in said chain, said last mentioned means including a shaft for said sprocket, a bearing for said shaft slidably mounted on said carriage and means for moving said bearing on said carriage.

5. A pipe bending machine comprising a frame, three pressure rollers rotatively supported by said frame, two of said rollers being arranged to rotate about separate fixed axes, a carriage movably mounted on said frame, means for rotatively mounting the third of said rollers on said carriage, a continouus chain for driving all of said rollers, an auxiliary sprocket mounted on said carriage adapted to engage said chain for controlling the tension therein, said third roller and said auxiliary sprocket being on opposite sides respectively of a line between the axes of rotation of said two rollers, and means for moving said carriage to change the distance between the axis of rotation of said third roller with respect to the axes of rotation of said other two rollers.

GEORGE DELBERT HULBURT.
RAYMOND EMORY CONAWAY.

REFERENCES CITED

The following references are of record in the file of this patent:

UNITED STATES PATENTS

| Number | Name | Date |
| --- | --- | --- |
| 425,591 | Marble | Apr. 15, 1890 |
| 677,142 | Richardson et al. | June 25, 1901 |
| 751,166 | Gorton | Feb. 2, 1904 |
| 1,575,655 | Stinson | Mar. 9, 1926 |
| 1,743,418 | Yates | Jan. 14, 1930 |
| 1,808,588 | Allen | June 2, 1931 |
| 2,010,056 | Brush | Aug. 6, 1935 |
| 2,027,564 | Stein et al. | Jan. 14, 1936 |

FOREIGN PATENTS

| Number | Country | Date |
| --- | --- | --- |
| 22,284 | Great Britain | July 23, 1908 |